United States Patent [19]

Matsubara et al.

[11] Patent Number: 5,247,387
[45] Date of Patent: Sep. 21, 1993

[54] METHOD AND DEVICE FOR DRIVING ELECTRO-OPTICAL LIGHT SHUTTER

[75] Inventors: Ken Matsubara, Takatsuki; Itaru Saito, Itami; Hirohisa Kitano, Osaka; Tomohiko Masuda; Kenichi Wada, both of Takatsuki, all of Japan

[73] Assignee: Minolta Camera Kabushiki Kaisha, Osaka, Japan

[21] Appl. No.: 753,427

[22] Filed: Aug. 30, 1991

[30] Foreign Application Priority Data

Sep. 5, 1990 [JP] Japan .................................. 2-236343
Sep. 5, 1990 [JP] Japan .................................. 2-236345

[51] Int. Cl.⁵ ..................... G02F 1/01; G01D 15/14; G03B 7/08
[52] U.S. Cl. .................................. 359/276; 359/245; 346/160; 354/463; 354/464
[58] Field of Search ................ 346/160; 354/457, 463, 354/464, 238.1; 359/245, 246, 254, 255, 276, 277, 85

[56] References Cited

U.S. PATENT DOCUMENTS

| | | | |
|---|---|---|---|
| 3,518,634 | 6/1970 | Ballman et al. | 359/245 |
| 3,556,663 | 1/1971 | Cary | 359/246 |
| 4,196,396 | 4/1980 | Smith | 359/245 |
| 4,716,384 | 12/1987 | Roe et al. | 359/276 |
| 4,902,111 | 2/1990 | Matsubara et al. | |
| 4,932,761 | 6/1990 | Shingaki et al. | |

FOREIGN PATENT DOCUMENTS

| | | | |
|---|---|---|---|
| 0287627 | 11/1989 | Japan | 359/245 |
| 1509808 | 9/1989 | U.S.S.R. | 359/245 |

Primary Examiner—Bruce Y. Arnold
Assistant Examiner—Evelyn A. Lester
Attorney, Agent, or Firm—Price, Gess & Ubell

[57] ABSTRACT

A method and device for driving an electro-optical light shutter array including a plurality of shutter elements each having an electro-optical effect to polarize an incident light by setting up an electric field. The device includes a plurality of individual electrodes provided on the respective shutter elements and a common electrode provided on the respective shutter elements electrically in common. A square pulse is applied to the arbitrary individual electrode while a triangular pulse is applied to the common electrode to set up an electric field of which an intensity continuously varies within one driving period. Moreover, an alternating electric field may be set up in the electro-optical light shutter array in a recovery period. In this case, a first light amount when the positive electric field is set up and a second light amount when the negative electric field is set up are detected. A recovery operation is carried out until the first and second light amounts become substantially equal with each other.

14 Claims, 13 Drawing Sheets

METHOD AND DEVICE FOR DRIVING ELECTRO-OPTICAL LIGHT SHUTTER

BACKGROUND OF THE INVENTION

1. Field of the Invention

The present invention relates to a method and a device for driving light shutters, and more particularly to a method and a device for driving a light shutter comprising electrooptical elements of PLZT or the like.

2. Description of the Related Art

U.S. Pat. No. 4,902,111 and U.S. Pat. No. 4,932,761 disclose light shutters wherein PLZT is used as a substance having an electrooptical effect. These PLZT light shutters have a high response speed and are therefore useful as optical heads for electrophotographic printers.

These PLZT light shutters have the drawback that the characteristics thereof vary with variations in temperature and with the lapse of time.

We determined the characteristics of the PLZT light shutter using the arrangement shown in FIG. 1. With reference to FIG. 1, a PLZT element 3 having a pair of electrodes 4, 5 is interposed between a polarizer 1 and an analyzer 2. The polarizer 1 and the analyzer 2 are so arranged that the polarization angles of light passing therethrough are orthogonal to each other. When an electric field is applied to the PLZT element 3, the polarization angle of light passing through the polarizer 1 is rotated through 90°, so that the light passes through the analyzer 2. On the other hand, if no electric field is applied to the PLZT element 3, the polarization angle of the light through the polarizer 1 is not rotated, so that the light is blocked by the analyzer 2. With this arrangement, a drive voltage is applied to the electrode 5 with the electrode 4 grounded to subject the PLZT element 3 to the electric field. The light from the analyzer 3 is detected by a photodetector 6, and the output from the photodetector 6 is amplified by an amplifier 7.

FIGS. 2, 3 and 4 show the characteristics of the PLZT element 3 determined by the above arrangement.

First, FIG. 2 shows the relationship between the drive voltage for the PLZT element 3 and the amount of transmitted light when the ambient temperature is 25° C., 50° C. and 70° C. The graph shows that the drive voltage (half-wavelength voltage) for giving a maximum amount of transmitted light increases as the ambient temperature rises. Acccordingly, even in the case where a half-wavelength voltage VH at room temperature (25° C.) is used as the drive voltage, the light amount decreases when the ambient temperature rises.

Next, FIG. 3 shows the relationship between the drive voltage for the PLZT element 3 and the amount of transmitted light in the initial state (solid line) and after driving for a long period of time (broken line). The diagram shows that in the initial state, the absolute value of half-wavelength voltage VH for giving the maximum amount of light is the same irrespective whether the polarity of the drive voltage is positive or negative. Nevertheless, after a positive drive voltage has been applied to the PLZT element 3 with irradiation with light for the long period of time, the drive voltage-light amount curve shifts toward the positive side in its entirety. With the drive voltage set to VH, therefore, the amount of transmitted light decreases with the lapse of time. For example, FIG. 4 shows variations in ON/OFF ratio (the ratio of ON-state to OFF-state in the amount of transmitted light) in the case where the PLZT element 3 is continuously driven while the element is being irradiated with light using a 150-W halogen lamp as the light source, a drive pulse voltage of 50 V (duty ratio: 50%) and a drive frequency of 2 kHz. FIG. 4 reveals that the ON/OFF ratio decreases with time from about 50 in the initial state to about 20. The decrease in the ON/OFF ratio is considered to be attributable to a space-charge layer formed in the vicinity of the electrode by carriers excited within the PLZT element 3 when the element 3 is driven and irradiated with light. The space-charge layer sets up within the PLZT element 3 an electric field which causes a leak of light when the element is turned off and a reduction in the amount of light when the element is turned on.

When the PLZT light shutter is used as the optical head for electrophotographic printers, the above-mentioned variations in the amount of transmitted light alters the amount of light to which the photosensitive member is to be exposed, consequently making it impossible to obtain images of high quality.

SUMMARY OF THE INVENTION

Accordingly, the main object of the present invention is to provide a method and a device for driving a light shutter which are capable of giving a substantially uniform amount of transmitted light at all times.

Another object of the present invention is to provide a method and a device for driving a light shutter which are adapted to afford an amount of transmitted light with diminished variations even in the event of variations in the ambient temperature.

Another object of the present invention is to provide a method and a device for driving a light shutter which are adapted to give an amount of transmitted light with diminished variation even in the event of fatigue of the light shutter.

Another object of the present invention is to provide a method and a device for driving a light shutter which permit the light shutter to recover from fatigue.

Still another object of the present invention is to provide a method and a device for driving a light shutter which are adapted to detect an optimum drive voltage for the light shutter.

BRIEF DESCRIPTION OF THE DRAWINGS

These and other objects or features of the present invention will become apparent from the following description of preferred embodiments thereof taken in conjunction with the accompanying drawings, in which:

FIG. 11 is a diagram showing a circuit for producing bias pulses of the waveform shown in FIG. 10a;

In the following description, like parts are designated by like reference numbers throughout the several drawings.

DESCRIPTION OF THE PREFERRED EMBODIMENTS

Embodiments of the present invention will be described below with reference to the drawings concerned.

Figure 5:
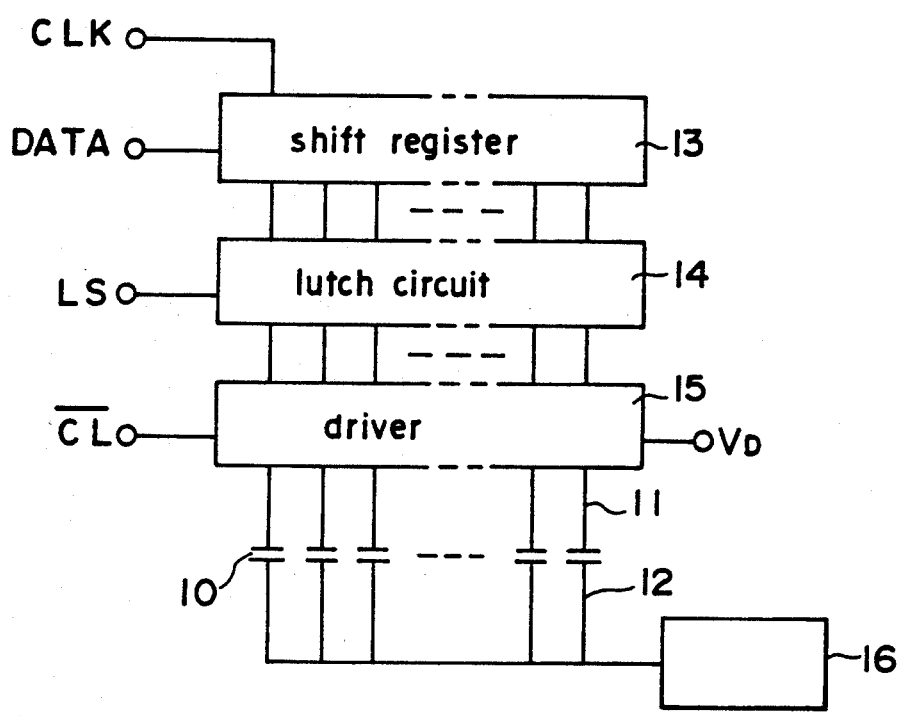
FIG. 5 is a diagram showing a shutter array drive circuit as a first embodiment of the invention.

FIG. 5 shows a drive circuit as a first embodiment of the invention. A plurality of shutter elements 10 wherein PLZT having an electrooptical effect is used are arranged in a line to provide a shutter array. Each of the shutter elements 10 has an individual electrode 11. A common electrode 12 is provided in common for the plurality of shutter elements 10. Since PLZT is a dielectric material, the shutter elements 10 are illustrated as capacitors in the drawing.

In the drive circuit, image data DATA is transferred to a shift register 13 as timed by a clock CLK. Upon transfer of items of image data for one line to the shift register 13, the image data within the shift register 13 is latched by a latch circuit 14 in response to a latch strobe signal LS. A driver 15 feeds a rectangular drive pulse (magnitude: VD) to some of the individual electrodes 11 in response to a drive signal CL. The drive pulse is applied to the selected ones of the individual electrodes 11 by the driver 15 in accordance with the image data latched by the latch circuit 14. More specifically, the drive pulse is applied to the individual electrodes 11 of the shutter elements 10 which are to be turned on, whereas no drive pulse is applied to the individual electrodes 11 of the shutter elements 10 which are not to be turned on. A bias circuit 16 is connected to the common electrode 12. In synchronism with the application of drive pulse to the individual electrodes 11, the bias circuit 16 applies to the common electrode 12 a bias pulse (maximum value: VT) of opposite polarity to the drive pulse and of a waveform which alters with time. Accordingly, the shutter element is subjected to an electric field corresponding to the sum of absolute values of the drive pulse and the bias pulse.

Figure 6:
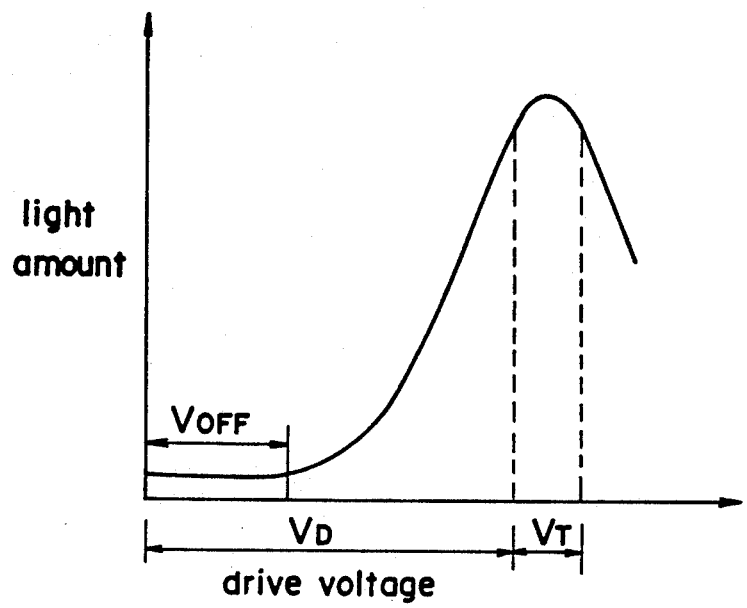
FIG. 6 is a graph showing the relationship between the drive voltage and the amount of transmitted light for illustrating the magnitude of drive pulse and bias pulse in the drive circuit of FIG. 5.
Figure 7:
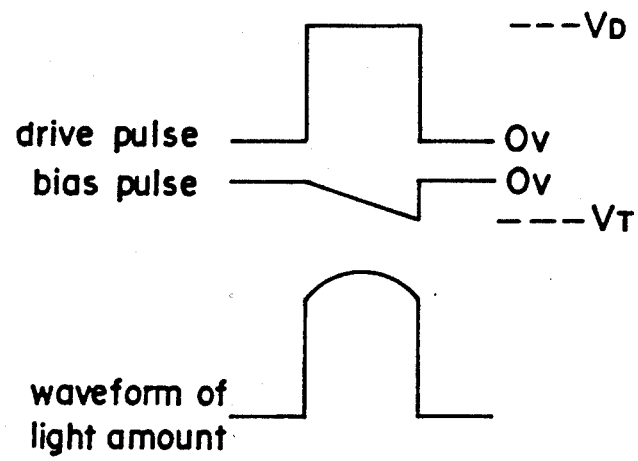
FIG. 7 is a diagram illustrating an amount of transmitted light when a drive pulse and bias pulse are applied to the drive circuit of FIG. 5.

With reference to FIG. 6, the magnitude VD of the drive pulse is set to such a value that the shutter element 10 provides a sufficient amount of transmitted light. On the other hand, the magnitude (maximum value) VT of the bias pulse is not greater than a voltage VOFF beyond which the amount of light through the shutter element 10 increases. Accordingly, the shutter element 10 having no drive pulse applied to its individual electrode 11 passes no light therethrough even if the bias pulse is applied to the common electrode 12. Further in the initial stage, the magnitude VD of the drive pulse is set to a value not greater than the half-wavelength voltage (for giving a maximum amount of transmitted light), while the magnitude VT of the bias pulse is so set that the sum of absolute values of the voltage VD and the voltage VT is not smaller than the half-wavelength voltage. As seen in FIG. 7, the bias pulse has a triangular waveform continuously varying from 0 volt to VT volt. It therefore follows that the waveform of the amount of light through the shutter element 10 which is subjected to an electric field due to the drive pulse and the bias pulse is in the form of a curve with a peak at its midportion when in an ideal state.

Figure 2:
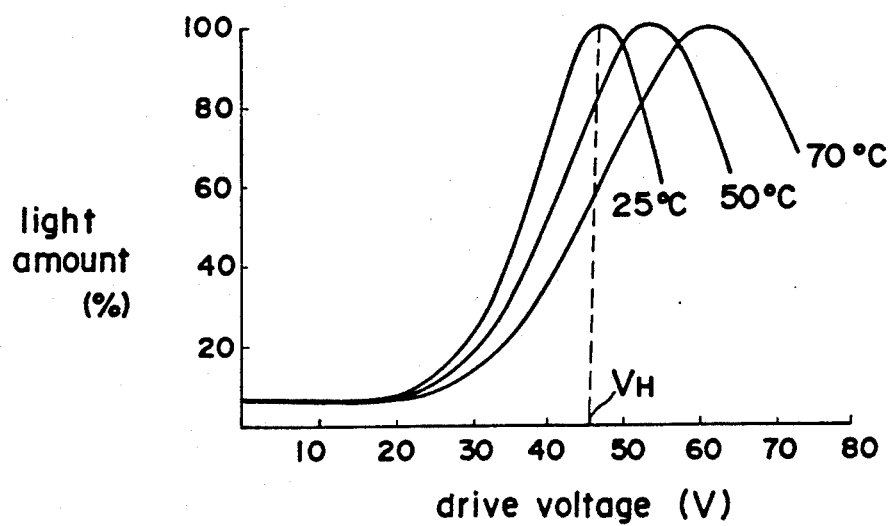
FIG. 2 is a graph showing the relationship between the drive voltage of the PLZT light shutter and the amount of transmitted light when the ambient temperature is 25° C., 50° C. and 70° C.
Figure 8A:
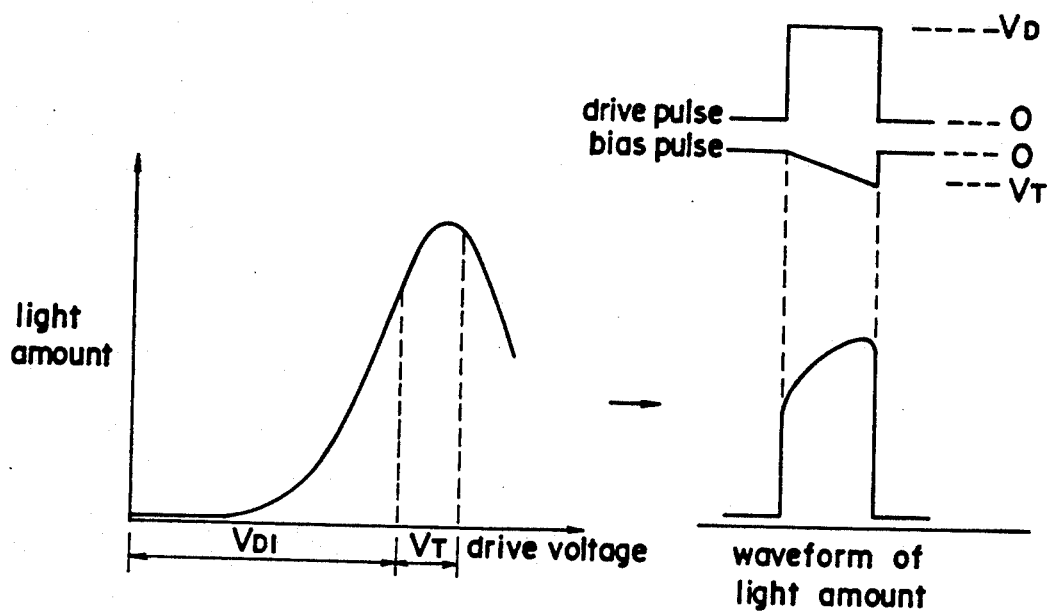
FIGS. 8a to 8c are diagrams showing amounts of transmitted light when drive pulses of varying magnitudes are applied to the drive circuit of FIG. 5.
Figure 8B:
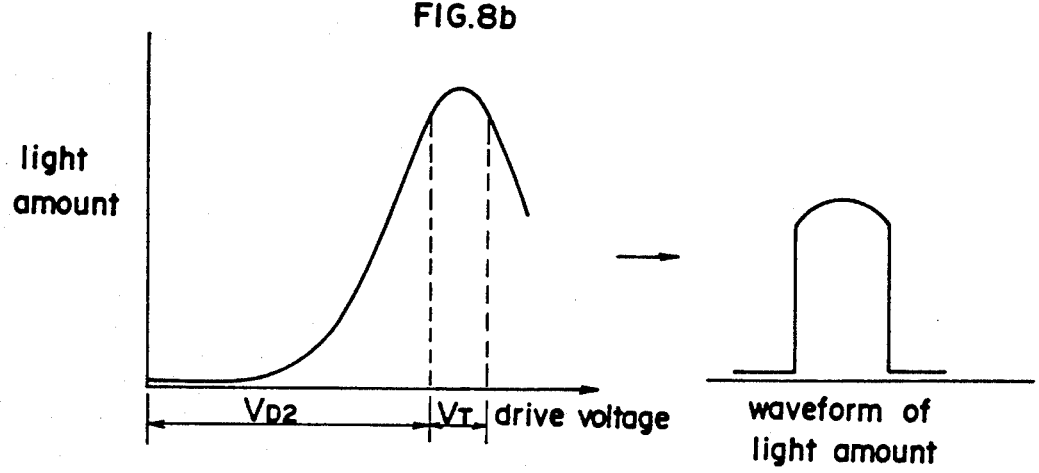
Figure 8C:
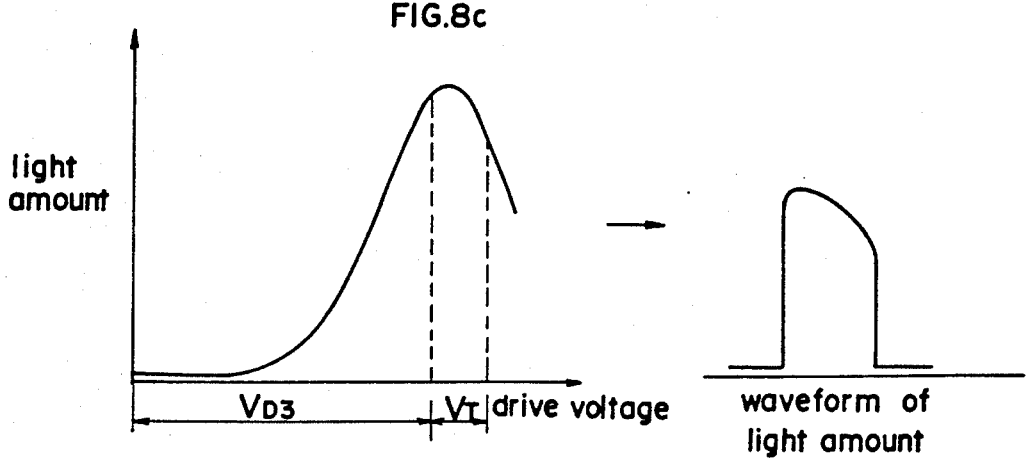

FIGS. 8a to 8c show amounts of light through the shutter element for which the magnitude VD of the drive pulse is varied without varying the bias pulse. The characteristics of PLZT vary with the ambient temperature (see FIG. 2). More specifically, the drive voltage-amount of transmitted light curve of the shutter element shifts with variations in the ambient temperature. Since the variation in the ambient temperature is in a relative relation with the variation in the drive voltage, the amounts of light illustrated in FIGS. 8a to 8c correspond to amounts of light at varying ambient temperatures. FIG. 8b shows an ideal state, and FIGS. 8a and 8c respectively represent a case wherein the drive voltage is lower than in the ideal state and a case wherein the drive voltage is higher than in the ideal state. In the case where the magnitude of the drive pulse is smaller than in the ideal state as seen in FIG. 8a, the amount of light is smallest at the leading edge of the drive pulse and greatest near the trailing edge of the pulse. Conversely, the amount of light is largest in the vicinity of the leading edge of the drive pulse and smallest at the trailing edge of the pulse when the magnitude of the drive pulse is greater than in the ideal state as shown in FIG. 8c. However, an electric field continuously varying with time is applied to the shutter element, so that the cumulative (integrated) amount of transmitted light during the application of the drive pulse does not noticeably change. This makes it possible to compensate for the variation in the characteristics of the shutter element due to variations in temperature or fatigue.

Figure 9:
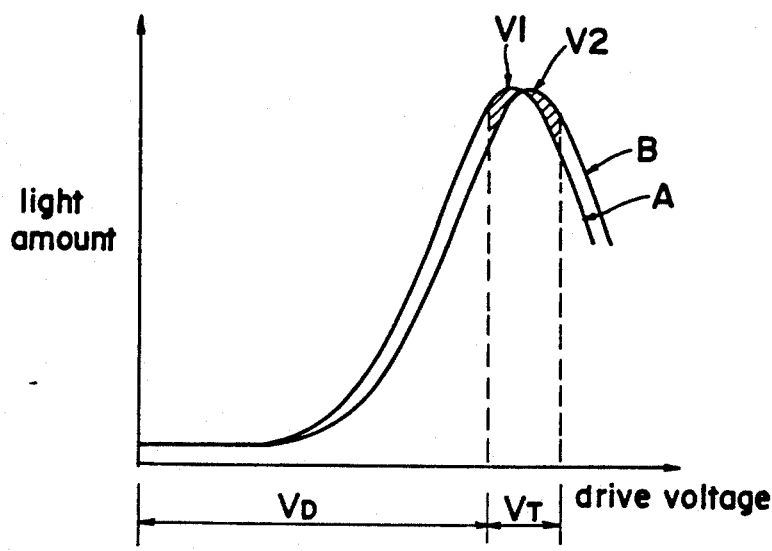
FIG. 9 is a graph showing the amounts of transmitted light resulting from variations in the characteristics of elements of the shutter array in the driven circuit shown in FIG. 5.

In the case of the shutter array having a plurality of shutter elements, the characteristics of individual shutter elements are likely to involve variations. For example with reference to FIG. 9 showing the drive voltage-amount of light curves of a shutter element A and a shutter element B, the two shutter elements differ in the drive voltage (half-wavelength voltage) at which the amount of transmitted light is maximum. However, if an electric field continuously varying with time is applied to the shutter element A and the shutter element B as already stated, the cumulative amounts of light through the respective shutter elements become approximately equal during the application of the electric field. More specifically stated, the difference between the shutter elements A and B in the cumulative amount of transmitted light is eliminated, with the hatched regions of FIG. 9 offset by each other by appying the electric field which continuously varies with time, whereby the variations in the characteristics of individual shutter elements of the shutter array can be compensated for.

Figures 10A, 10B, 10C, 10D:
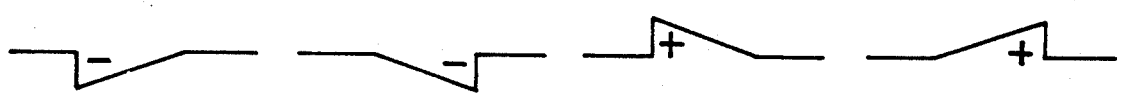
FIGS. 10a to 10d are diagrams showing varying waveforms of bias pulses for use in the drive circuit of FIG. 5.

The bias voltage for use in the first embodiment may have any of varying waveforms such that the magnitude of the pulse continuously increases from a negative VT volt to 0 volt (FIG. 10a), continuously decreases from 0 volt to the negative VT volt (FIG. 10b), continuously decreases from a positive VT volt to 0 volt (FIG. 10c), or continuously increases from 0 volt to the positive VT volt (FIG. 10d). However, when the bias voltage to be applied to the common electrode 12 has the waveform of FIG. 10c or 10d, the drive pulse to be applied to the individual electrodes 11 should have a magnitude of (VD+VT) volt, whereby the shutter element can be subjected to an electric field continuously varying with time from an electric field due to VD volt to an electric field due to (VD+VT) volt, and vice versa.

Figure 11:
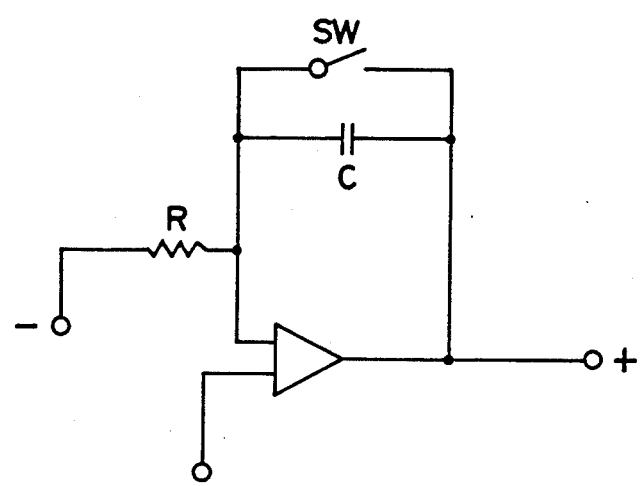

FIG. 11 shows an example of circuit for producing bias pulses of the waveform shown in FIG. 10a. A capacitor C is connected in parallel with an analog switch SW, which is held closed for a predetermined period of time for short-circuiting to produce a bias voltage of the waveform continuously rising from the negative VT volt to 0 volt.

Although the voltage to be applied to the individual electrodes 11 is made constant with the voltage to be applied to the common electrode 12 altered according to the foregoing embodiment, the common electrode 12 may be grounded or connected to a constant potential source, with the drive pulse to be applied to the individual electrodes 11 made continuously varied with time in magnitude.

Figure 12:
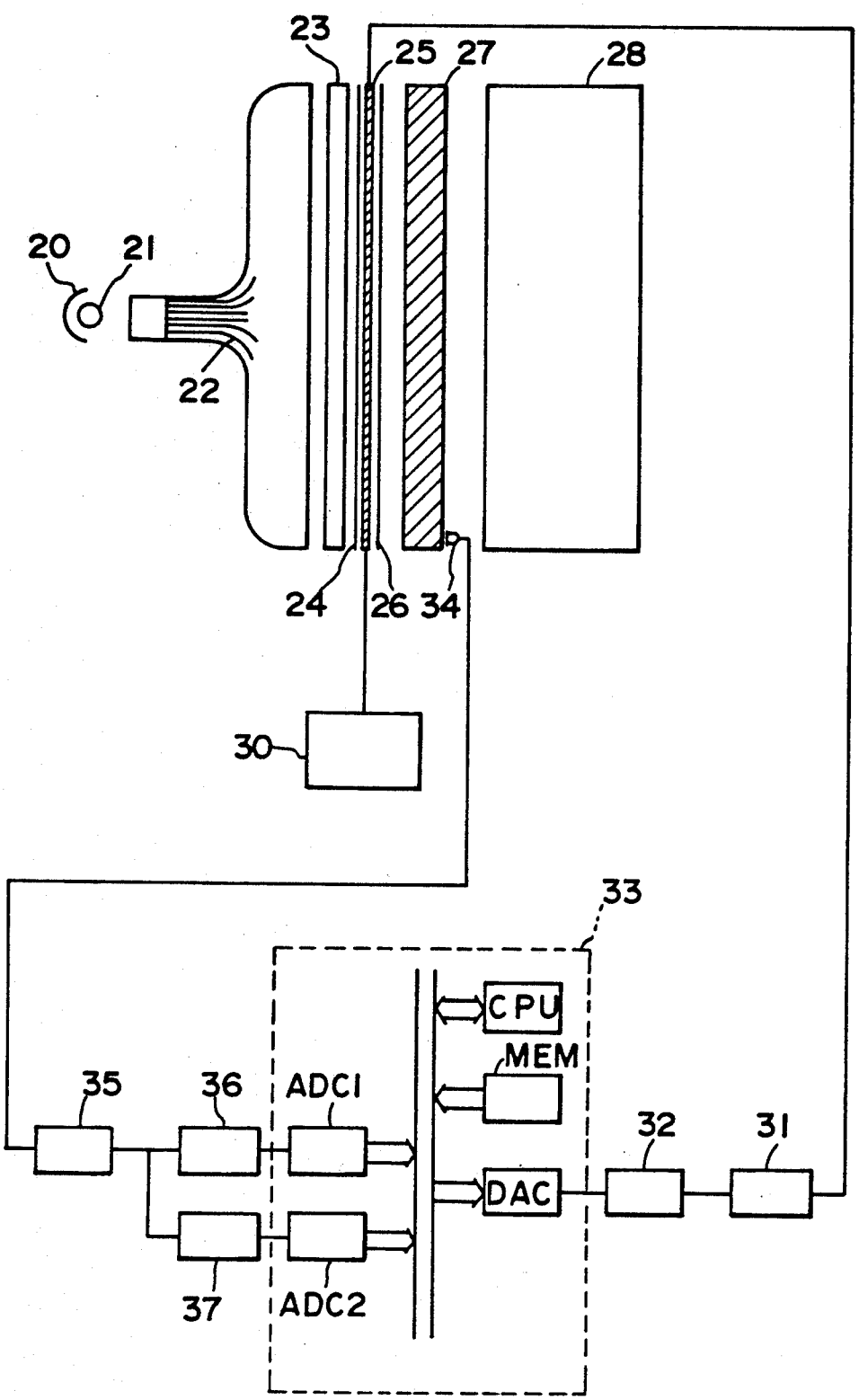
FIG. 12 is a diagram schematically showing the construction of an electrophotographic printer having incorporated therein a shutter array drive circuit as a second embodiment of the invention.

FIG. 12 is a diagram showing a second embodiment of the present invention. The diagram schematically shows the construction of an electrophotographic printer having a shutter array.

A light source comprising a reflecting mirror 20 and a lamp 21 emits light, which impinges on an optical fiber array 22. The optical fibers of the array 22 have light emitting portions arranged in a line, such that the array 22 emanates beams of light as arranged in a line. The light from the optical fiber array 22 passes through a rod lens 23 and a polarizer 24 and irradiates the above-mentioned shutter array indicated at 25. The shutter array 25 comprises a plurality of shutter elements wherein PLZT having an electro-optical effect is used and which are arranged in a line. The light passing through the shutter array 25 is incident on an analyzer 26. The light passing through the analyzer 26 is guided to a photosensitive member 28 through an array 27 of light transmission fibers of graded refractive indexes. In the above arrangement, the shutter elements of the shutter array 25 are selectively driven to form images on the photosensitive member 28.

The shutter array 25 is driven by a circuit which is generally the same as the drive circuit of the first embodiment shown in FIG. 5. More specifically, the shutter elements have a common electrode connected to a bias circuit 30 similar to the bias circuit 16, and individual electrodes connected to a drive pulse applying circuit 31 which includes a shift register 13, a latch circuit 14 and a driver 15. Since the bias circuit 30 and the drive pulse applying circuit 31 are substantially the same as those of the first embodiment in construction and operation, the different features thereof only will be described. The drive pulse applying circuit 31 is connected to a variable voltage source 32, and the drive pulse to be applied to the shutter elements by the circuit 31 is variable in magnitude. The voltage to be supplied from the variable voltage source 32 to the applying circuit 31 is determined in accordance with a control signal from a controller 33.

The second embodiment includes a photodetector 34 disposed immediately in front of the photosensitive member 28 for receiving light from a specified one of the shutter elements of the array 25. The output from the photodetector 34 is fed to sample holding circuits 36 and 37 via an amplifier. Each of the sample holding circuits 36 and 37 holds the output voltage of the amplifier 35 in response to a sample holding signal from the controller 33.

The controller 33 includes a CPU for controlling the printer in its entirety, a memory MEM for storing image data, etc., a D/A converter DAC for converting the control signal to be fed to the variable voltage source 32 from digital signal to analog signal, and A/D converters ADC1 and ADC2 for converting an analog signal from the sample holding circuits 36 and 37 to a digital signal. Signals are transmitted between the components of the controller 33 through bus lines.

Figure 13:
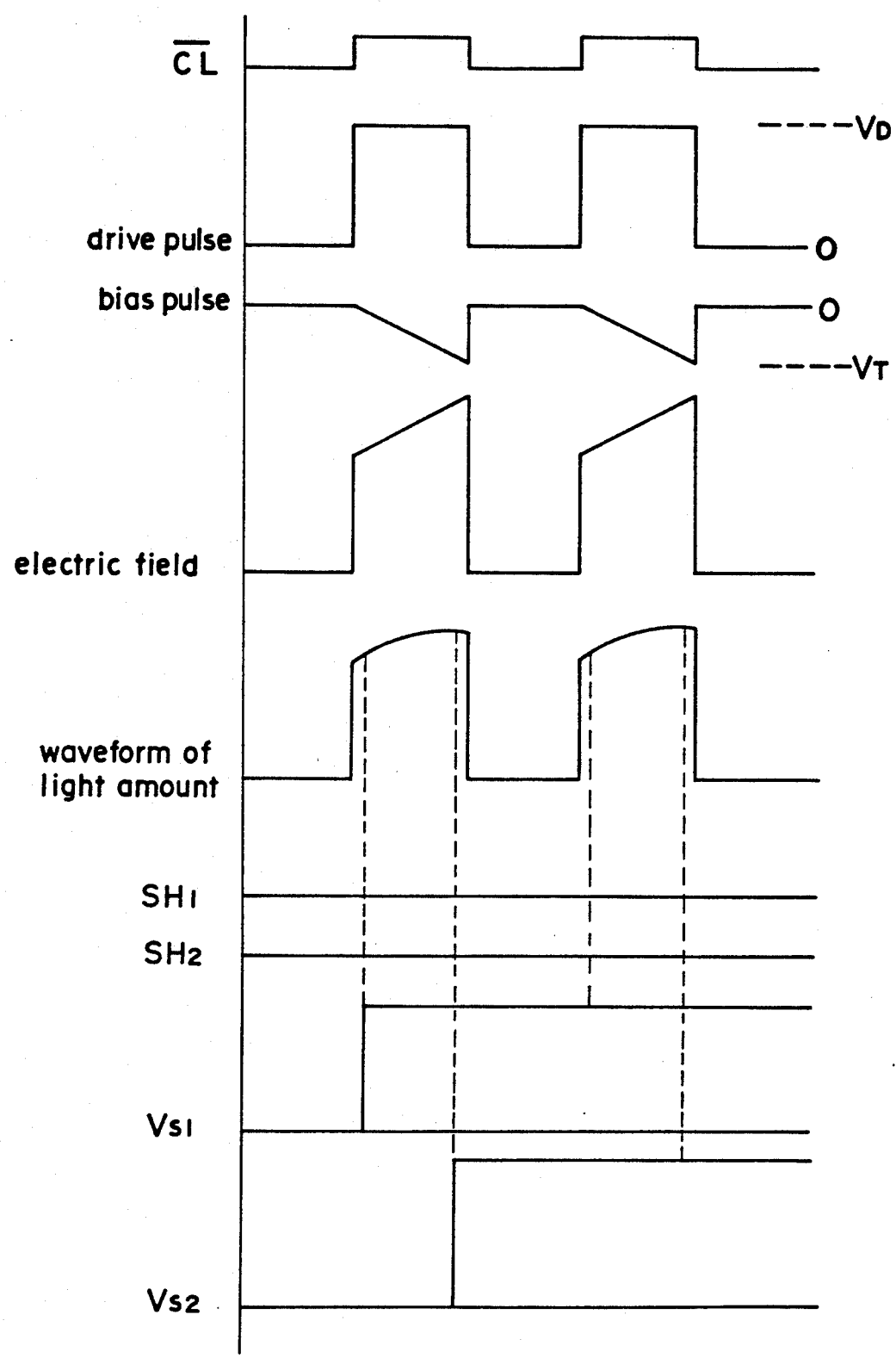
FIG. 13 is a time chart showing signal waveforms involved in the operation of the drive circuit shown in FIG. 12.

With reference to FIG. 13, the drive pulse applying circuit 31 feeds a rectangular drive pulse having the magnitude of the voltage VD from the variable voltage source 32 to the individual electrodes of the specified shutter elements in response to a drive signal C1 from the controller 33. In synchronism with the application of the drive pulse, the bias circuit 30 applies to the common electrode of the shutter elements a bias pulse (maximum value: VT) of a magnitude continuously varying with time. Consequently, the electric field applied to the shutter element continuously varies with time. At this time, the waveform of the amount of light through the shutter element subjected to the electric field is symmetrically curved with a peak at its midportion when in an ideal state as already described with reference to the first embodiment (FIG. 8b). On the other hand, the waveform is asymmetrically curved when the voltage is lower or higher than in the ideal state (FIG. 8a or 8c).

The second embodiment is therefore so adapted that the amount of light transmitted through the shutter element is checked for the symmetry of its waveform at two points, i.e., at the initial stage of application of the electric field which varies continuously with time and at the final stage of the application. The controller 33 feeds a sample holding pulse SH1 to the sample holding circuit 36 upon the rise of the drive signal CL. In response to this pulse SH1, the sample holding circuit 36 holds as a sample an output voltage VS1 delivered from the amplifier 35 and corresponding to the current amount of transmitted light. Further immediately before the fall of the drive signal CL, the controller 33 feeds a sample holding pulse SH2 to the sample holding circuit 37. In response to the pulse SH2, the circuit 37 in turn holds as a sample an output voltage VS2 delivered from the amplifier 35 and corresponding to the current amount of transmitted light. The output voltages VS1 and VS2 delivered from the amplifier 35 and held by the sample holding circuits 36 and 37 are converted to digital signals and fed to the controller 33. The controller 33 interprets the waveform of the transmitted light amount as being symmetric if the two voltages VS1 and VS2 are the same. On the other hand, if the voltage VS1 is lower than the voltage VS2, the controller 33 causes the variable voltage source 32 to increase the voltage VD to be supplied to the drive pulse circuit 31. Conversely, if the voltage VS1 is higher than the voltage VS2, the controller 33 functions to decrease the voltage VD. The drive pulse can be set to an optimum magnitude VD for giving the largest amount of transmitted light by checking the waveform of amount of the light in this way. Further since the amount of light is detected simultaneously with the application of drive pulse, the optimum value is detectable in real time.

Figure 1:
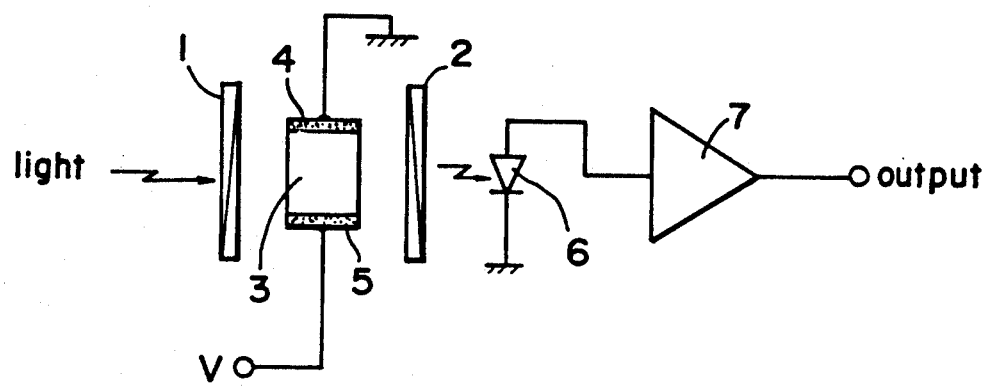
FIG. 1 is a diagram showing an arrangement for determining the characteristics of a PLZT light shutter.
Figure 3:
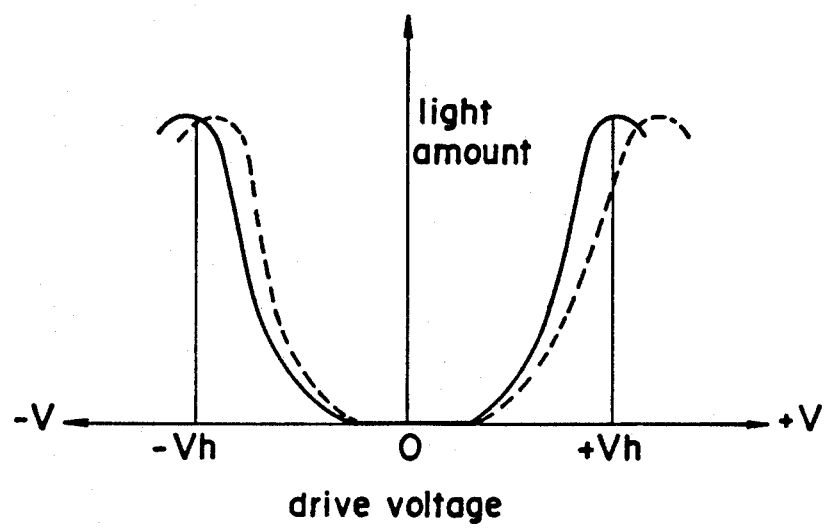
FIG. 3 is a graph showing the relationship between the drive voltage of the PLZT light shutter and the amount of transmitted light in the initial state and after the shutter has been driven for a long period of time.
Figure 4:
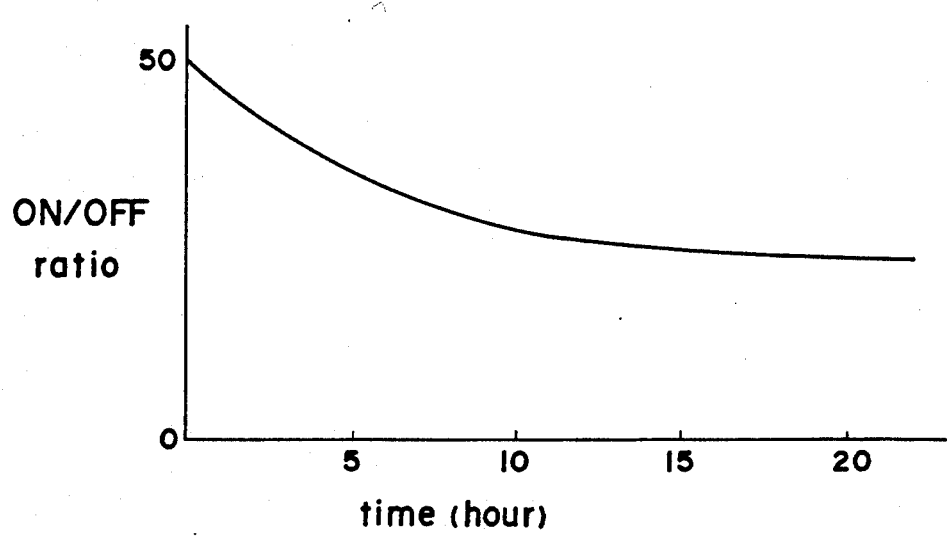
FIG. 4 is a graph showing variations in ON/OFF ratio with the lapse of time in the case where the PLZT light shutter is continuously driven.
Figure 14:
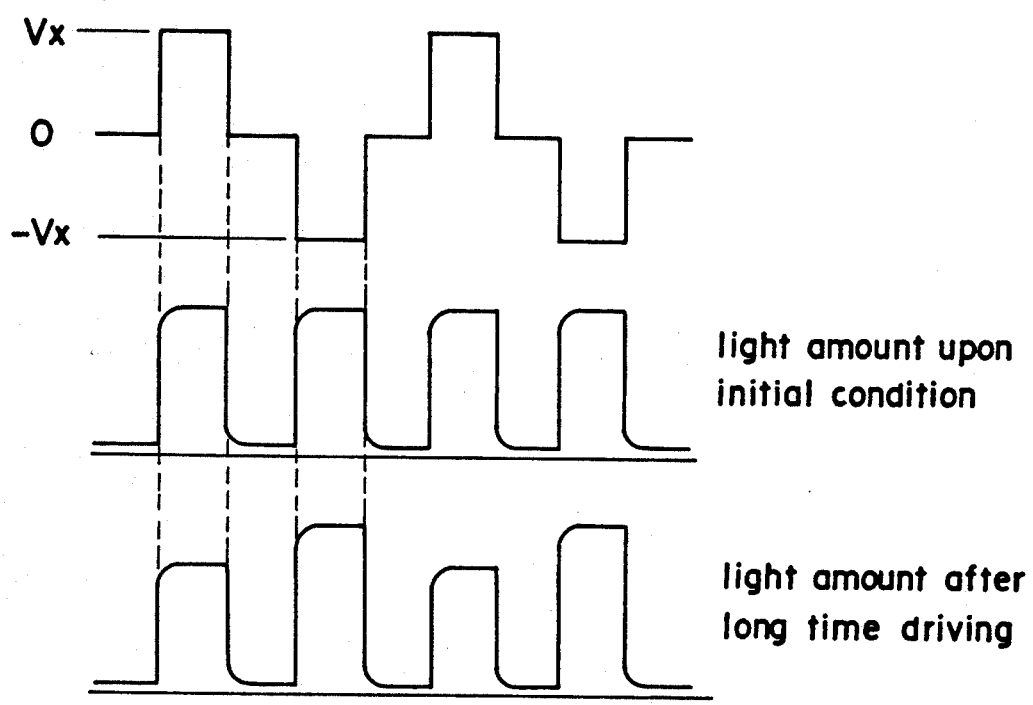
FIG. 14 is a diagram showing the amount of transmitted light in the case where the PLZT light shutter is driven with a voltage the polarity of which is alternately reversed.

Next, a third embodiment of the invention will be described. The third embodiment is adapted to recover the light shutter from fatigue. As already described with reference to FIG. 3, the drive voltage-light amount curve shifts in its entirety if the light shutter is driven for a long period of time while it is being irradiated with light. With reference to FIG. 14, when pulses of the same magnitude but opposite in polarity are alternately applied to the light shutter, the amount of transmitted light (output of photodetector 6 in FIG. 1) is initially the same for the pulses of opposite poralities, whereas after the shutter has been driven for a long time, the amount of light varies with the difference in polarity. The third embodiment utilizes this phenomenon for detecting the fatigue of the light shutter.

Figure 15:
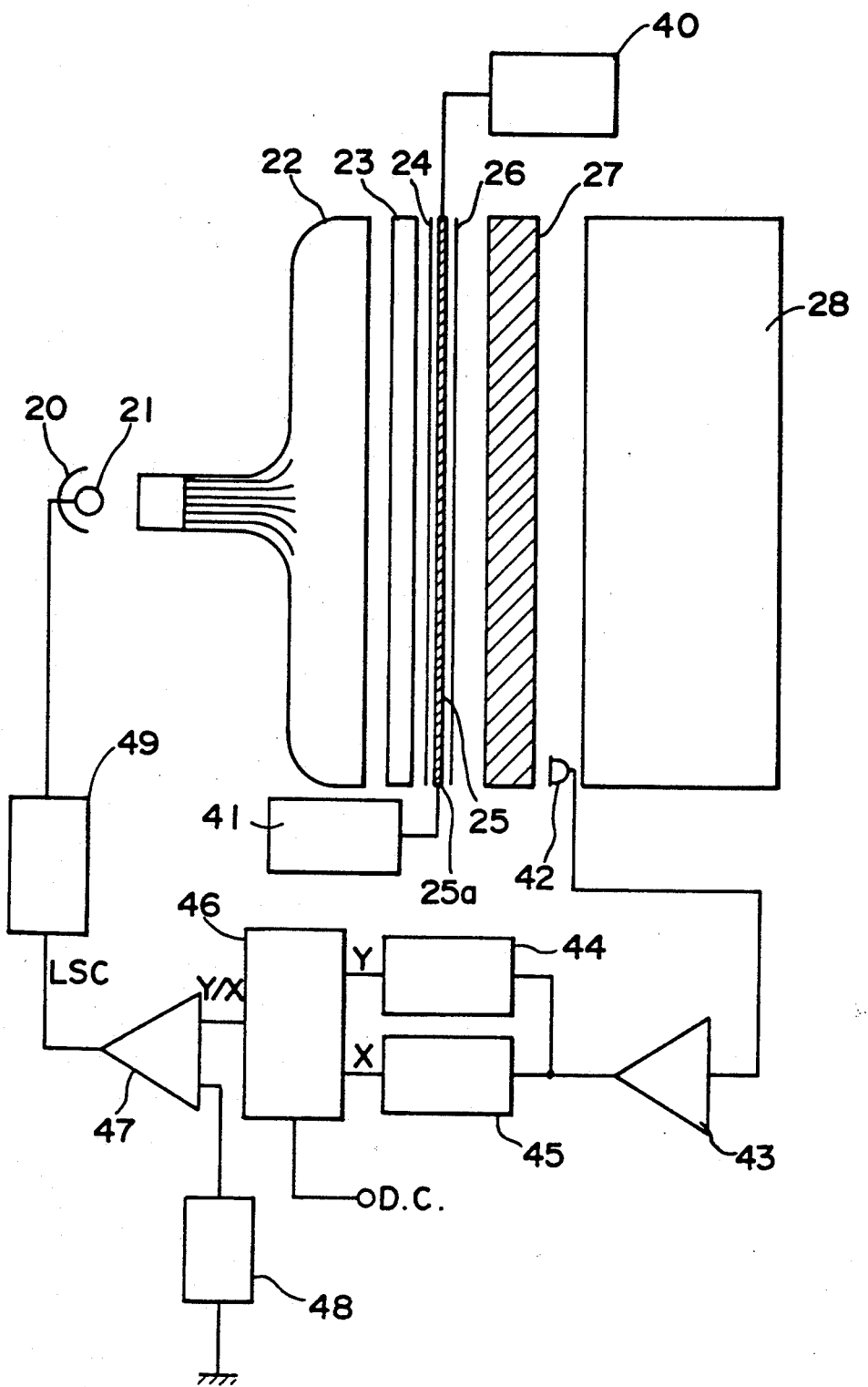
FIG. 15 is a diagram schematically showing the construction of an electrophotographic printer having incorporated therein a shutter array drive circuit as a third embodiment of the invention.

FIG. 15 shows the third embodiment. Throughout FIGS. 15 and 12 showing the second embodiment, like parts are designated by like reference numerals and will not be described again.

Figure 16:
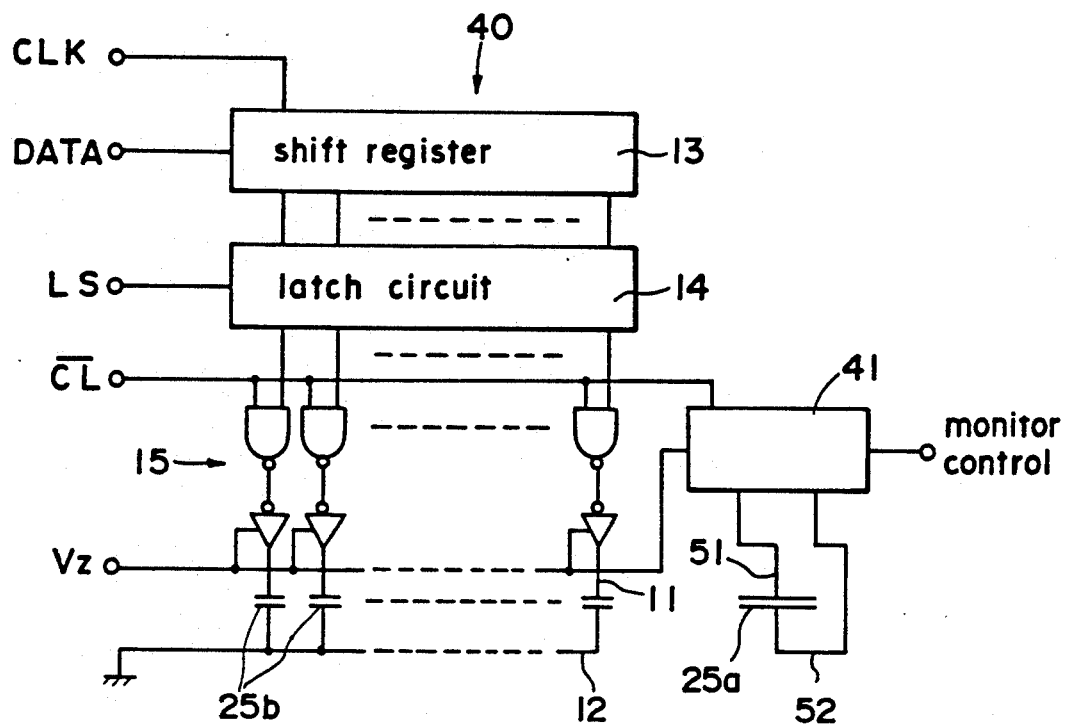
FIG. 16 is a fragmentary diagram showing the drive circuit of FIG. 15.

The shutter array 25 of the third embodiment has a monitoring shutter element 25a in addition to a plurality of image recording shutter elements 25b. Although a drive circuit 40 for the image recording shutter elements 25b and a drive circuit 41 for the monitoring shutter element 25a are shown in FIG. 15 as separate blocks, the two drive circuits are actually in the form of a unit as seen in FIG. 16. Further a photodetector 42, such as a photodiode, for detecting the amount of light through the monitoring shutter element 25a is positioned as opposed to the element 25a immediately in front of the photosensitive member 28.

The output of the photodetector 42 is fed to sample holding circuits 44 and 45 via an amplifier 43. The circuit 44 serves to hold the output of the photodetector 42 when the monitoring shutter element 25a is subjected to an electric field opposite in direction to the electric field applied during image recording. The other sample holding circuit 45 holds the output of the photodetector 42 when the monitoring shutter element 25a is subjected to an electric field in the same direction as the electric field to be applied during image recording. The outputs Y and X of the respective circuits 44 and 45 are fed to a divider 46, which performs the calculation of Y/X and delivers the result of calculation to a comparator 47. The comparator 47 compares the output Y/X of the divider 46 with a reference value of "1" provided by a reference voltage generator 48 and feeds a light source control signal LSC to a light source control circuit 49. The control signal LSC is at a high level when Y/X>1, i.e., when the output Y is greater than the output X, and then turns on the lamp 21, whereby an operation for recoving the light shutter array from fatigue is performed. When Y/X≦1, the light source control signal LSC is reduced to a low level to turn off the lamp 21 to discontinue the recovery operation for the light shutter array.

FIG. 16 shows a circuit including the drive circuit 40 for the image recording shutter elements 25b and the drive circuit 41 for the monitoring shutter element 25a as a unit. Throughout FIGS. 5 and 16, like parts are designated by like reference numerals.

In the drive circuit, image data DATA is transferred to a shift register 13 as timed by a clock CLK. Upon the transfer of items of image data for one line to the shift register 13, the image data within the shift register 13 is latched by a latch circuit 14 in response to a latch strobe signal LS. In response to a drive signal CL, a driver 15 feeds a drive pulse (magnitude: VZ) to selected ones of the individual electrodes 11. More specifically, the drive pulse is applied to the individual electrodes 11 of the image recording shutter elements 25b which are to be turned on, whereas no drive pulse is applied to the individual electrodes 11 of the shutter elements 25b which are not to be turned on. The common electrode 12 is grounded, and an electric field of specified direction is applied to the shutter element 25b. The shutter elements 25b are on-off controlled as timed with the rotation of the photosensitive member 28 for every line continually until images are recorded for one page.

Figure 17:
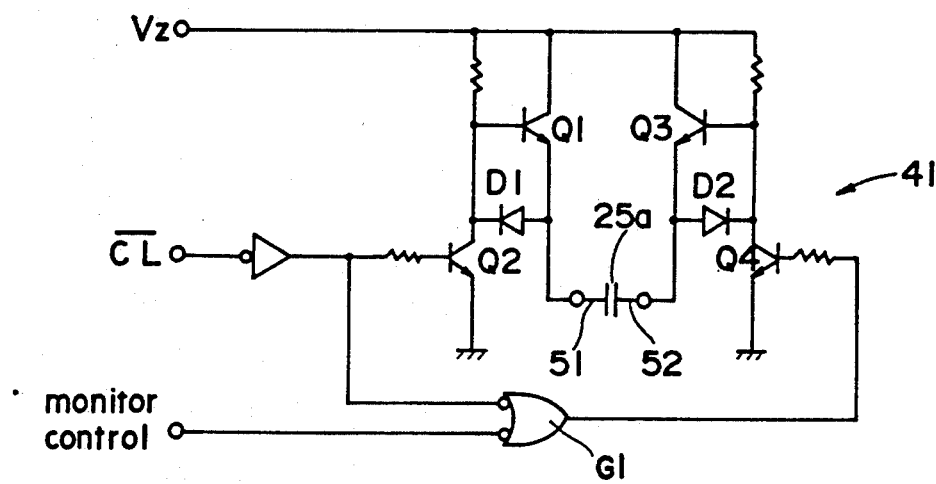
FIG. 17 is a diagram showing the construction of a monitor circuit shown in FIG. 16.

The minotoring shutter element 25a has a first electrode 51 and a second electrode 52 which are connected to the monitor circuit 41, which applies an electric field to the monitoring shutter element 25a in response to the drive signal C1 and a monitor control signal. As seen in FIG. 17, the monitor circuit 41 reverses the direction of electric field to be applied to the monitoring shutter element 25a in accordance with whether the monitor control signal is at a high level or low level. During image recording, the monitor control signal is maintained at the low level, so that the output of a gate G1 is at a high level, bringing a transistor Q4 into conduction. With the conduction of the transistor Q4, the second electrode 52 is brought to the ground level. In response to the drive signal CL at this time, voltage VZ is applied to the first electrode 51 of the monitoring shutter element 25a. During the image recording period, therefore, the monitoring shutter element 25a is subjected to an electric field of the same direction as the image recording shutter elements 25b. During a standby period wherein no image is recorded, the monitor control signal is maintained at the high level, with the result that a signal which is the drive signal CL as inverted is applied to the bases of transistors Q2 and Q4, whereby the voltage VZ is applied to the first electrode 51 and the second electrode 52 alternately for the monitoring shutter element 25a. During the stand-by period, accordingly, an alternating electric field is applied to the monitoring shutter element 25a.

Figure 18:
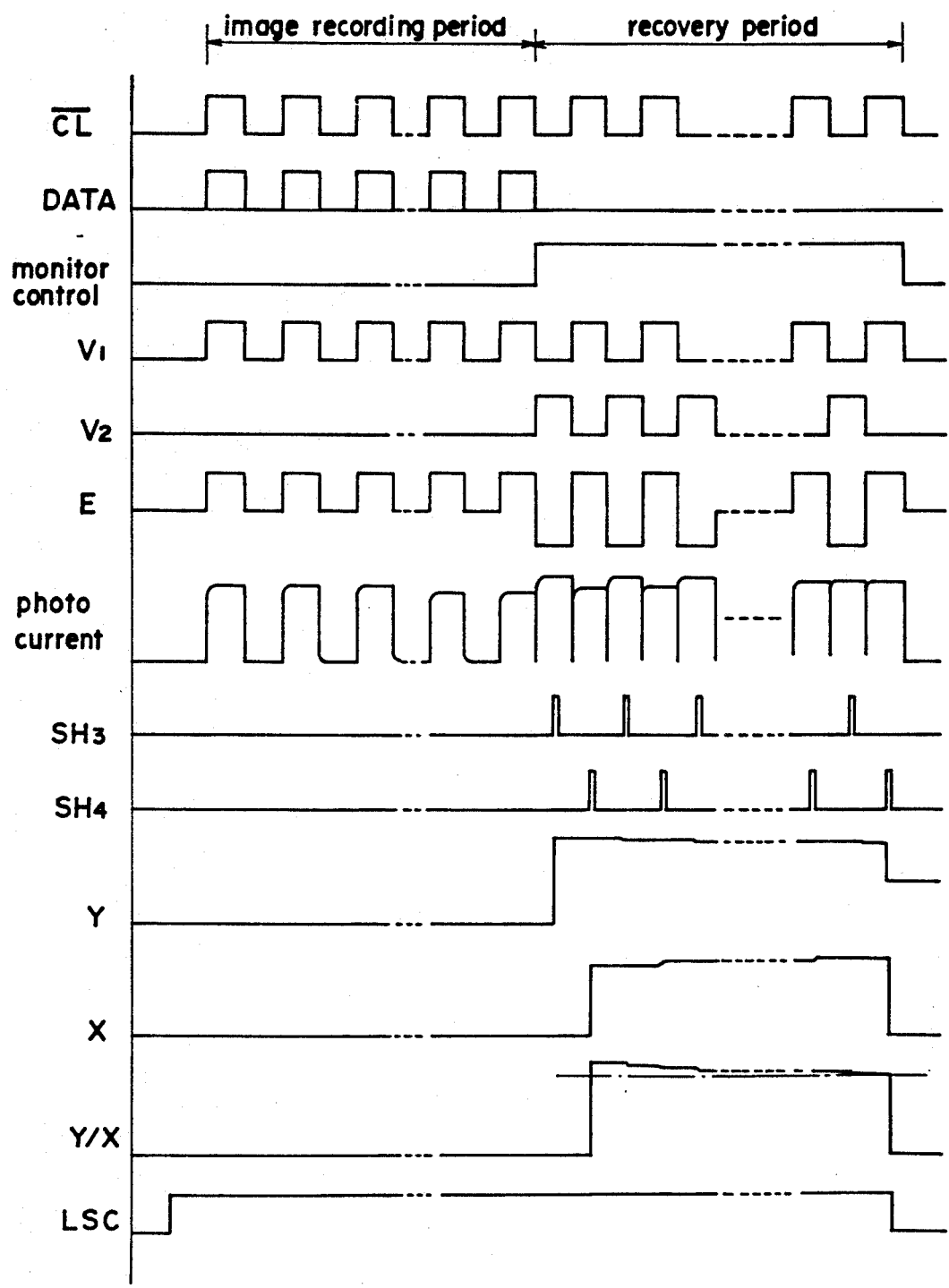
FIG. 18 is a time chart showing signal waveforms involved in the operation of the drive circuit shown in FIG. 15.

FIG. 18 is a time chart showing signal waveforms involved in the operation of the drive circuits shown in FIGS. 15, 16 and 17. The drawing shows voltages V1 and V2 to be applied respectively to the first electrode 51 and the second electrode 52 of the monitoring shutter element 25a, electric field E to be applied to the element 25a, photo current which is the output of the photodetector 42, sample holding pulses SH3 and SH4 to be given respectively to the sample holding circuits 44 and 45, and light source control signal LSC.

When a printing start command (not shown) is given, the drive signal CL is produced to start image recording in accordance with image data DATA. During the image recording period, the monitoring shutter element 25a is driven with an electric field of the same direction as the electric field applied to the image recording shutter elements 25b. As will be apparent from the illustrated output of the photodetector 42, the amount of transmitted light in ON-state decreases but increases in OFF state with continuation of image recording. Subsequently during a recovery period, an alternating electric field is applied to the monitoring shutter element 25a. When an electric field (negative) opposite in direction to the electric field in the image recording period is applied to the shutter element 25a, the sample holding pulse SH3 is fed to the sample holding circuit 44, and the resulting output of the photodetector 42 is held as a sample. When an electric field (positive) of the same direction as the electric field in the recording period is given to the monitoring shutter element 25a, the sample holding pulse SH4 is applied to the sample holding circuit 45, and the resulting output of the photodetector 42 is held as a sample. Immediately after the image recording period, the ratio of the output Y of the circuit 44 to the output X of the circuit 45, i.e., Y/X, is greater than 1, so that the light source control signal LSC is maintained at the high level, consequently holding the lamp on to recover the light shutter array from fatigue. The recovery operation thus effected reduces the ratio Y/X to 1, whereupon the light source control signal LSC is changed to the low level to turn off the lamp and complete the recovery operation.

The control signals such as the drive signal CL, image data DATA, monitor control signal and sample holding pulses SH3 and SH4 are delivered from an unillustrated control unit. A microcomputer is usable as the control unit.

While the shutter array is irradiated with light for recovery from fatigue according to the embodiment described above, an alternating electric field may be applied to the recording shutter elements 25 during the irradiation.

Figure 19:
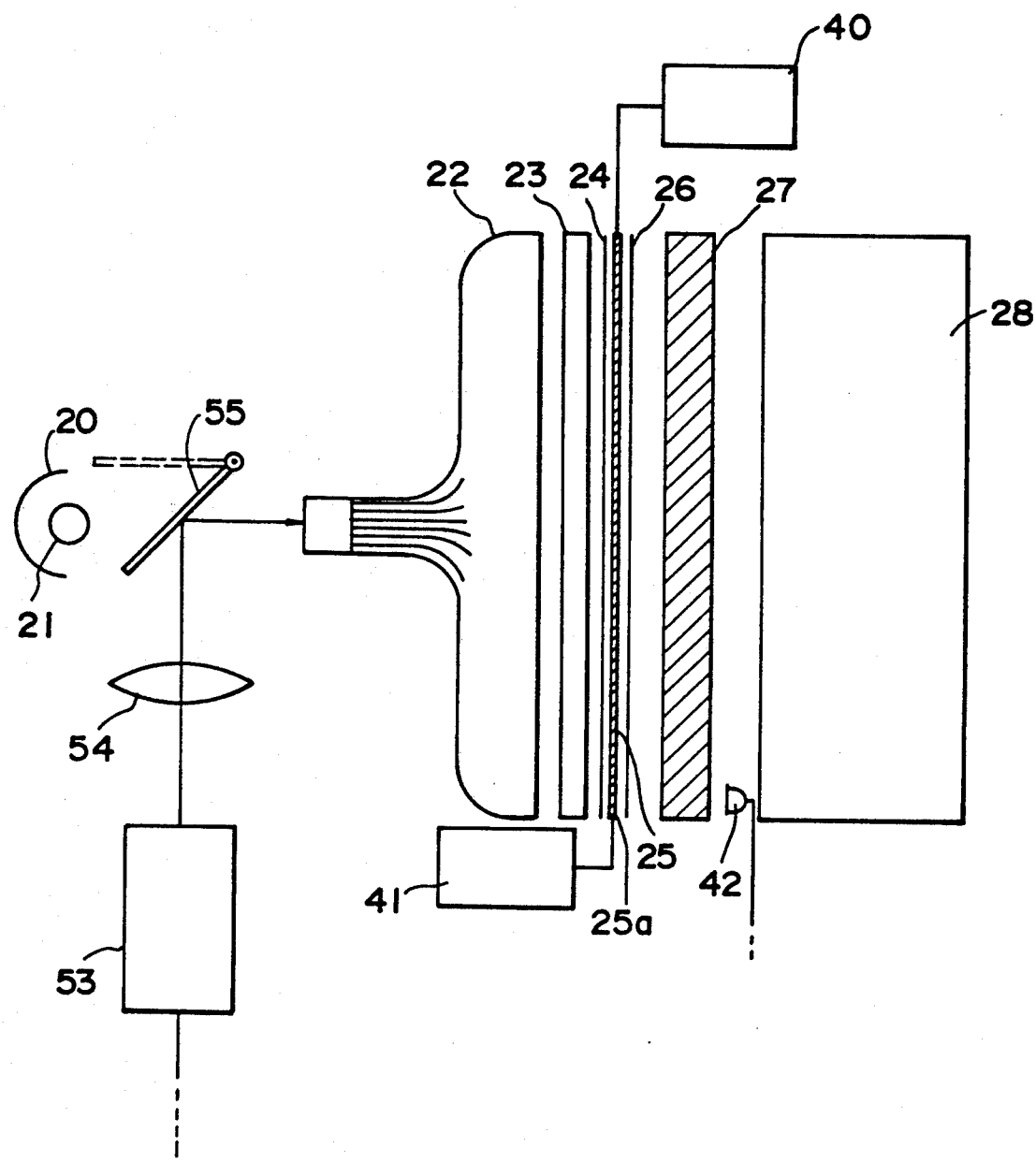
FIG. 19 is a diagram showing a modification of the construction shown in FIG. 15.

Although the image recording lamp is used also as the light source for irradiating the shutter array with light for recovery from fatigue, other light source may be used. For example, a light source is usable which emits light of high intensity in the ultraviolet region. More effective recovery can then be achieved. In this case, a mercury lamp 53 for emitting light of high intensity in the ultraviolet region is provided separately from the image recording lamp 21 as seen in FIG. 19. The light from the mercury lamp 53 is incident on the optical fiber array 22 via a condenser lens 54 and a movable mirror 55. During the image recording period, the movable mirror 55 is held in a position indicated in broken lines in the drawing and will not block the light from the lamp 21. For the recovery operation, the movable mirror 55 is moved to the solid-line position shown between the lamp 21 and the fiber array 22 to guide the light from the mercury lamp 53 to the fiber array 277. Although the light is changed over by moving the movable mirror 55 in this arrangement, the light source itself may alternatively be moved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of driving an electro-optical light shutter having an electro-optical effect to polarize an incident light by setting up an electric field, the method comprising the steps of:

detecting a variation of characteristics of the electro-optical light shutter, including
   setting up a first electric field in the electro-optical light shutter,
   detecting a first light amount from the electro-optical light shutter when the first electric field is set,
   setting up a second electric field having a direction opposite to that of the first electric field in the electro-optical light shutter,
   detecting a second light amount from the electro-optical light shutter when the second electric field is set, and
   comparing the first and second light amounts; and
   recovering the variation of the characteristics of the electro-optical light shutter.

2. A method as claimed in claim 1, wherein the recovering step includes the step of
   projecting light to the electro-optical light shutter.

3. A device for driving an electro-optical light shutter having an electro-optical effect to polarize an incident light by setting up an electric field, the device comprising:

a pair of electrodes provided on the electro-optical light shutter;
   driving means for setting up an alternating electric field in the electro-optical light shutter;
   detecting means for detecting a first light amount from the electro-optical light shutter when the positive electric field is set up and a second light amount from the electro-optical light shutter when the negative electric field is set up and determining a predetermined loss in the light transmission ability of the electro-optical light shutter; and
   recovery means responsive to the detecting means for carrying out a recovery operation of restoring the light transmission ability until the first and second light amounts become substantially equal with each other, said recovery means including projecting means for projecting light to the electro-optical light shutter during said recovery operation.

4. A device as claimed in claim 3, wherein said projecting means projects ultraviolet light.

5. A method of driving an electro-optical light shutter having an electro-optical effect to polarize an incident light by setting up an electric field, the electro-optical light shutter being subject to a loss of light transmission by a fatigue effect of the light shutter, the method comprising the steps of:

detecting fatigue of the electro-optical light shutter; and projecting ultraviolet light to the electro-optical light shutter for recovering from the fatigue detected.

6. A device for driving an electro-optical light shutter having an electro-optical effect to polarize an incident light by setting up an electric field, the device comprising:

a pair of electrodes provided on the electro-optical light shutter for setting up an electric field in the electro-optical light shutter;

a first light source for projecting light to the electro-optical light shutter during an operation period;

first driving means for setting up a predetermined electric field in the electro-optical light shutter to polarize the incident light during said operation period;

second driving means for setting up an alternating electric field in the electro-optical light shutter during a recovery period other than said operation period;

detecting means for detecting a first light amount from the electro-optical light shutter when the positive electric field component of said alternating electric field is set up and a second light amount from the electro-optical light shutter when a negative electric field component of said alternating electric field is set up; and a second light source, responsive to the detecting means, for projecting ultraviolet light to the electro-optical light shutter until the first and second light amounts from the first light means become substantially equal with each other.

7. The device of claim 6, wherein the second light source is applied when the first light source is turned off.

8. A method of compensating for a decrease in light transmission of an electro-optical light shutter resulting from fatigue believed to be caused by a space charge bias formed in the vicinity of the electrodes when the light shutter is driven in an ON condition and irradiated with light for extended periods of time for image processing, comprising the steps of:

monitoring the output of the electro-optical light shutter through a predetermined shutter element to provide a monitor signal;

sampling the monitor signal when the predetermined shutter element is subject to a first electric field in a direction which is the same direction as the electric field applied during the ON condition of image recording, to provide a first sample signal;

sampling the monitor signal when the predetermined shutter element is subject to a second electric field which is opposite in direction to the first electric field, to provide a second sample signal;

determining the fatigue condition from the first and second sample signals relative to a predetermined reference value; and activating a light source to effect a recovery of the light shutter from the fatigue condition when a determination of fatigue has been made.

9. The method of claim 8, wherein the sampling to provide a second sample signal occurs during a nonimaging time period.

10. The method of claim 9, wherein the activation of the light source to relieve fatigue occurs during a nonimaging time period.

11. The method of claim 10, wherein a wavelength range of the light source for relieving fatigue is different than the wavelength range of a light source for image processing.

12. The method of claim 11, wherein the light source for relieving fatigue provides ultraviolet light rays.

13. A device for driving an electro-optical light shutter having an electro-optical effect to polarize an incident light by setting up an electric field, the light shutter having a light transmission characteristic that deteriorates over a constant period of operation, comprising:

a first light source for providing a source of light to the light shutter for proving indicia through the light shutter;

means for monitoring the light transmission characteristic of the light shutter for the first light source;

a second light source of a different wavelength range than the first light source to counter the deterioration of the light transmission of the first light source through the light shutter; and means, in response to the monitoring means, to activate the second light source when the monitored deterioration of light transmission reaches a predetermined level to counter the deterioration effect and to restore the light transmission characteristics of the light shutter to the first light source.

14. The device of claim 13, wherein the second light source is ultraviolet light and is applied when the first light source is deactivated.

* * * * *

UNITED STATES PATENT AND TRADEMARK OFFICE
CERTIFICATE OF CORRECTION

PATENT NO. : 5,247,387
DATED : September 21, 1993
INVENTOR(S) : Ken Matsubara et al.

It is certified that error appears in the above-indentified patent and that said Letters Patent is hereby corrected as shown below:

On the cover page:

under [75] Inventors, delete "Kenichi Wada, both";

under [30] Foreign Application Priority Data, delete "Sept. 5, 1990 [JP] Japan .... 2-236345".

Signed and Sealed this

Seventh Day of May, 1996

Attest:

BRUCE LEHMAN

Attesting Officer

Commissioner of Patents and Trademarks